US007048018B2

(12) United States Patent
Ghizzi et al.

(10) Patent No.: US 7,048,018 B2
(45) Date of Patent: May 23, 2006

(54) HEAD AND A PROCESS FOR FILLING CONTAINERS WITH POWDER MATERIAL

(75) Inventors: Stefano Ghizzi, Marmirolo (IT); Stefano Cavallari, Bologna (IT)

(73) Assignee: Azionaria Construzioni Macchine Automatiche A.C.M.A. S.p.A., Bologna (IT)

( * ) Notice: Subject to any disclaimer, the term of this patent is extended or adjusted under 35 U.S.C. 154(b) by 265 days.

(21) Appl. No.: 10/469,517

(22) PCT Filed: Mar. 18, 2002

(86) PCT No.: PCT/IB02/00811

§ 371 (c)(1),
(2), (4) Date: Sep. 2, 2003

(87) PCT Pub. No.: WO02/074627

PCT Pub. Date: Sep. 26, 2002

(65) Prior Publication Data

US 2004/0112651 A1    Jun. 17, 2004

(30) Foreign Application Priority Data

Mar. 20, 2001   (IT)   ................ BO01A0156

(51) Int. Cl.
   *B65B 1/34* (2006.01)
(52) U.S. Cl. ........................ 141/83; 177/145
(58) Field of Classification Search ............... 177/145; 141/83
   See application file for complete search history.

(56) References Cited

U.S. PATENT DOCUMENTS

| 3,814,196 A | | 6/1974 | McClusky | ............ 177/54 |
| 5,064,009 A | * | 11/1991 | Melcher et al. | ............ 177/245 |
| 5,877,457 A | * | 3/1999 | Corniani et al. | ............ 177/116 |
| 6,089,283 A | | 7/2000 | Sienerth | ............ 141/75 |
| 6,627,826 B1 | * | 9/2003 | Cavina et al. | ............ 177/145 |

FOREIGN PATENT DOCUMENTS

| DE | 2063378 A | 6/1972 |
| EP | 0790183 | 8/1997 |

* cited by examiner

*Primary Examiner*—Randy W. Gibson
(74) *Attorney, Agent, or Firm*—Timothy J. Klima

(57) ABSTRACT

A filler head (1) carried by the carousel of a rotary powder filling machine comprises a dispensing element (3) by which a predetermined quantity of powder material is directed into a container (2) positioned on a platform assembly (7, 5) carried by a hollow frame (13); the dispensing element (3) is interlocked to a dynamometer (15) housed in the cavity (14) of the frame (13) and controllable thus during the step of filling the container (2). The platform support (5) is associated with a first actuator (18) mounted at the bottom of the frame (13) and designed to separate the selfsame support (5) from the dynamometer (15), also with a second actuator (21) by which the container (2) is caused to shake in a direction (B) that causes the powder material to settle in the container (2) during the filling operation.

21 Claims, 2 Drawing Sheets

HEAD AND A PROCESS FOR FILLING CONTAINERS WITH POWDER MATERIAL

This application is the national phase of international application PCT/IB02/00811 filed Mar. 18, 2002 which designated the U.S. and that international application was published under PCT Article 21(2) in English. This application claims priority to Italy Patent application number BO2001A 000156 filed Mar. 20, 2001.

1. Technical Field

The present invention relates to a head, and to a process, for filling containers with powder material.

2. Background Art

In particular, the present invention finds application advantageously in the art field of automatic filling machines equipped with a carousel carrying a plurality of filler heads by which liquid or powder material is batched into containers, each head equipped with a dispensing device designed to direct a given quantity of material by free fall into a relative container positioned on a platform assembly.

The prior art embraces automatic machines for filling containers with liquid or powder material in which the operation of the single dispensing device is interlocked to a relative weighing unit fitted to the carousel and designed to sense the weight of the container continuously. At a given moment during the fill when the unit in question indicates a predetermined weight corresponding to that of the full container, the dispensing device will cut off the flow of material, for example by closing a valve on a feed duct carrying the material to the selfsame dispensing device.

The conventional filling method outlined above betrays a drawback however, in the case of machines handling powder material, deriving from the fact that the material does not settle properly inside the container.

In effect, the powder material falling into the container heaps typically into a cone. It will be evident that during the course of the fill, and especially toward the final stages, a part of the material tends to remain outside the container and scatter into surrounding space, with the result that a complete and correct fill is rendered impossible. The prior art embraces filler heads designed to overcome this drawback, comprising suitable means by which to vibrate the container on the relative platform assembly.

In one embodiment, such means consist in a cam element engaging the platform from beneath, in such a way as to invest the container with reciprocating motion along a vertical axis. This type of mechanical action obviously precludes the use of the weighing system referred to above, which would be affected by the alternating movement.

In the particular case of powder materials, the quantity of material released from the dispensing device into the container is appropriately metered during the fill, utilizing a volumetric system of measurement, and the weight of the container then checked at a point downstream of the filling station. Due to the low accuracy of volumetric filling methods, the measurement of the quantity of material introduced into the single container is notably lacking in precision and a correct fill is never achieved.

The prior art also embraces powder filling heads of a type able both to invest a container with movement and to measure the weight of material dispensed into the selfsame container.

Such heads are furnished with a shaker device interposed between the platform assembly and the weighing unit. In this solution, the weighing unit is embodied as a load cell associated with the platform assembly, which it actively engages during the fill.

The shaker device sets the container in motion, causing it either to reciprocate or to describe substantially orbital oscillations, so that the powder material is suitably compacted internally of the container during the fill.

The shaker device is able to move the container within a horizontal plane only, so that the operation of the weighing unit will not be affected. In this way, the container is weighed and at the same time agitated by the shaker device so as to correct the tendency of the dispensed powder material to heap into a cone. The movements induced in the container affect neither the weighing unit nor the value sensed by the unit, since they are generated transversely to the vertical weigh axis.

Nonetheless, this prior art solution likewise betrays a notable drawback deriving from the scant effectiveness of the movement induced in the container by the shaker device.

In effect, the horizontal vibration of the container enables only a limited compaction of the powder material, and especially so in cases where cohesion between the surfaces of the constituent particles is particularly strong.

The object of the present invention is to provide a head and a process for filling containers with powder material such as will allow of overcoming the drawbacks mentioned above.

In particular, it is an object of the invention to provide a head and a process for filling containers with powder material such as will enable single containers to be filled with a precise quantity of well-compacted powder.

DISCLOSURE OF THE INVENTION

The stated object is realized according to the present invention in a head for filling containers with powder material, comprising at least one support on which to stand at least one corresponding container, at least one dispensing element positioned in alignment with the support and serving to direct the powder material into the container, also means by which to weigh the container, associated with the support and operating along a substantially vertical weigh axis, characterized in that it comprises means by which to separate the support from the weighing means.

The stated object is realized likewise in a process according to the present invention for filling containers with powder material, including the steps of placing a container on a support, filling the container with the powder material at least in part, and weighing the quantity of powder material introduced into the container through the agency of weighing means associated with the support and operating along a substantially vertical weigh axis, characterized in that it comprises the step of separating the support from the weighing means.

The invention will now be described in detail, by way of example, with the aid of the accompanying drawings, in which:

DETAILED DESCRIPTION OF THE INVENTION

Figure 1:
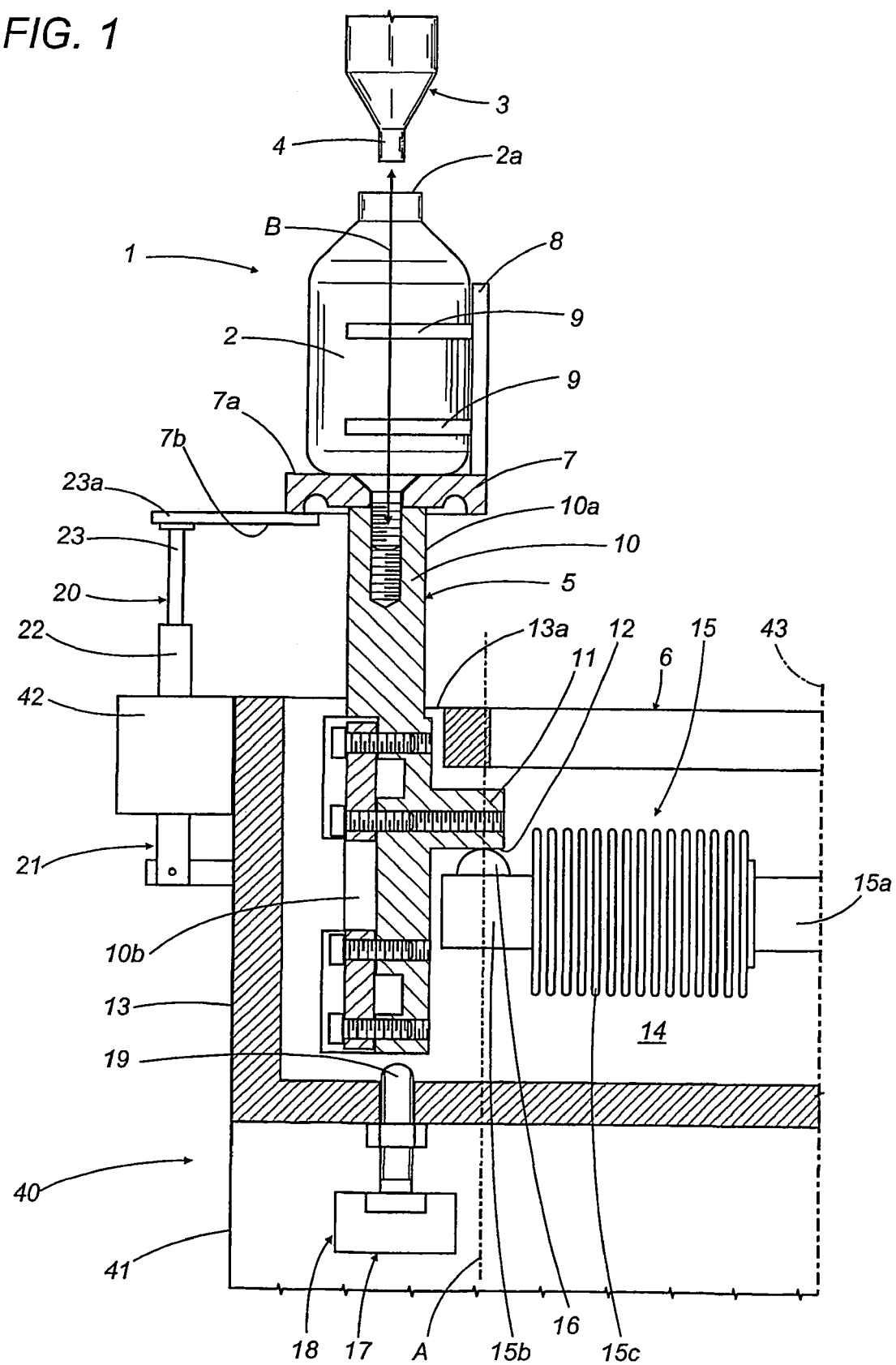
FIG. 1 shows a head for filling containers with powder material according to the present invention, viewed in elevation with certain parts in section or omitted better to reveal others, and illustrated during a weighing step.

With reference to the drawings, 1 denotes a filler head, in its entirety, by which containers 2 each presenting a mouth 2a uppermost are filled with measured quantities of a powder material.

The head 1 forms part of a filling machine not illustrated in the drawings. Such a machine comprises a carousel 40 indicated only in part, presenting a base-plate 41 and a horizontal disc 42 rotatable about a vertical axis 43. The carousel 40 carries a plurality of filler heads 1 ordered circumferentially around the disc 42. As the carousel 40 rotates, the filler heads 1 are advanced along a circular filling path extending between an infeed station at which empty containers 2 are placed on the carousel 40, each aligned with a relative filler head 1, and an outfeed station at which filled containers 2 are removed from the carousel 40 and conveyed toward a unit by which a cap is applied to the mouth 2a.

Each filler head 1 comprises a dispensing element 3 of conventional embodiment, indicated fragmentarily and schematically as terminating in a duct 4 from which a predetermined quantity of powder material is caused to fall freely into the relative container 2. The dispensing element 3 is equipped with means of familiar type, not illustrated in the accompanying drawings, serving to control the flow of powder material through the duct 4. Such means might be embodied, for example, as a valve by which the duct 4 is opened and closed.

Each container 2 is placed on a relative support 5 associated with weighing means 6 operating along a substantially vertical weigh axis A.

The support 5 comprises a horizontal platform 7 on which to stand the container 2, furnished with an upright 8, also with arms 4 extending laterally from the upright and serving to restrain the container 2. To advantage, the platform 7 consists in a plate with an upwardly directed or top surface 7a offered in direct contact to the container 2, and a downwardly directed or bottom surface 7b opposite from the top surface 7a.

The support 5 further comprises a substantially vertical connecting element 10 affording at least a first portion 10a, associated with the platform 7 by way of the bottom surface 7b, and at least a second portion 10b remote from the first portion 10a.

In a preferred embodiment, the second portion 10b will present a projection 11 extending from the connecting element 10 in a substantially horizontal direction. The underside of the projection 11 presents a contact surface 12.

The weighing means 6 comprise a frame 13 substantially of box construction that presents an opening 13a in the side uppermost. The frame 13 affords a cavity 14 housing a dynamometer 15. The dynamometer 15 is of elongated appearance, with a first end 15a anchored to the frame 13 and a second freely projecting end 15b, remote from the first, presenting an active portion 16 extending upward toward the opening 13a, also a central portion 15c located between the first and second ends 15a and 15b and deformable under the weight of the support 5. The dynamometer 15 interacts with the support 5 by way of the active portion 16 of the second end 15b.

In effect, it will be seen that the connecting element 10 of the support 5 is inserted at least partly into the cavity 14 by way of the opening 13a in the frame 13.

The second portion 10b of the connecting element 10 is positioned inside the cavity 14 and in such a way that the contact surface 12 of the projection 11 can engage the active portion 16 of the dynamometer 15, whilst the first portion 10a is positioned externally of and above the frame 13.

Thus, the weight of the powder material dispensed into the container 2 can be measured continuously by the weighing means 6 during the fill (FIG. 1). The dispensing element 3 is interlocked to the weighing means 6 in conventional manner (not illustrated) in such a way that the flow of powder material can be cut off once a predetermined weight has registered and the container 2 is full.

The contact surface 12 of the projection 11 can be isolated from the active portion 16 of the dynamometer 15 (FIG. 2) through the agency of means denoted 17, by which the support 5 is separated from the weighing means 6.

Such means 17 comprise a first actuator 18 mounted advantageously to the base of the frame 13 and impinging actively on the support 5 in such a way as to move the selfsame support 5 between a first operating condition in which the contact surface 12 is isolated from the active portion 16 of the dynamometer 15 (FIG. 2), and a second condition in which the contact surface 12 engages the active portion 16 (FIG. 1).

The first actuator 18 comprises a forcing element denoted 19, capable of movement between a first position in which it engages the second portion 10b of the connecting element 10 to the end of shifting the support 5 into the operating condition of the separating means 17, and a second position in which it is distanced from the second portion 10b of the connecting element 10.

The actuator 18 in question can be embodied as an electromagnet. To advantage, the forcing element 19 can be made to move in a substantially vertical direction in order to engage the second portion 10b, as discernible in FIG. 2.

The filler head 1 also comprises shaking means 20 connected to the support 5, by which the selfsame support 5 is caused to move along a shaking direction denoted B.

The shaking means 20 comprise a second actuator 21 having a fixed portion 22 anchored to the frame 13 and a movable portion 23 actively engaging the support 5 in such a way as to invest it with reciprocating movement along the shaking direction B.

More exactly, the fixed portion 22 is positioned to coincide with the opening 13a in the frame 13, and the movable portion 23 is insertable into the fixed portion 22. The movable portion 23 appears substantially as a rod of which the end 23a engages the underside of the platform 7 of the support.

Figure 2:
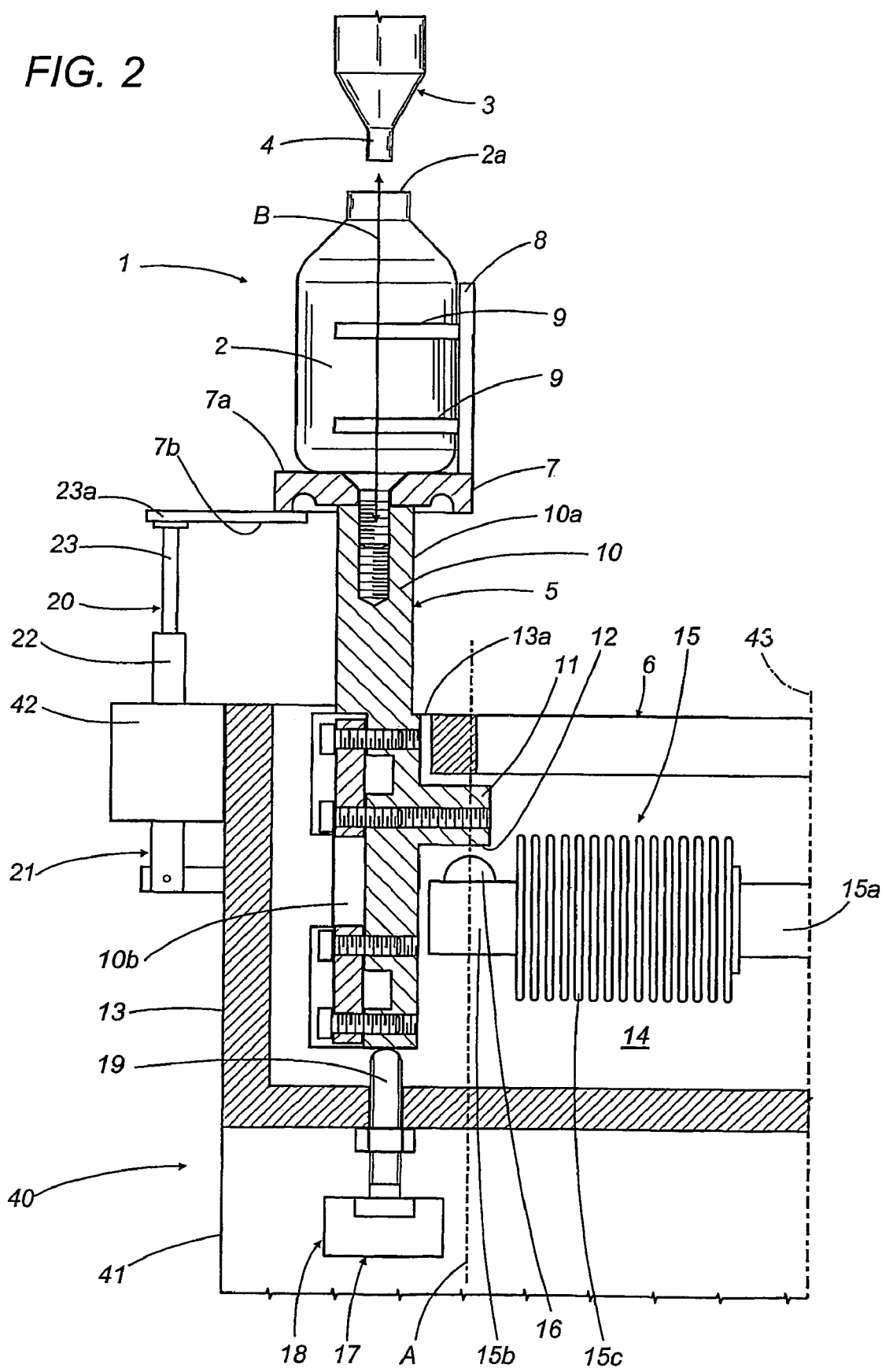
FIG. 2 shows the head of FIG. 1 viewed in elevation with certain parts in section or omitted better to reveal others, and illustrated during a shaking step.

In a first preferred embodiment illustrated in FIGS. 1 and 2, the movable portion 23 extends longitudinally in a direction substantially parallel to the weigh axis A and the rod end 23a engages the bottom surface 7b of the platform 7. In this example, the movable portion 23 is slidable within the fixed portion 22 along a shaking direction B substantially parallel to the weigh axis A.

In an alternative embodiment not illustrated in the accompanying drawings, the movable portion 23 might extend longitudinally in a direction substantially transverse to the weigh axis A, with the rod end 23a anchored to the connecting element 10 or to the platform 7. With this type of arrangement, the movable portion 23 will be slidable within the fixed portion 22 along a shaking direction B substantially transverse to the weigh axis A.

To advantage, the movement induced in the support 5 by the second actuator 21 will be of a reciprocating or vibratory nature.

In a preferred embodiment of the invention, the second actuator might consist in a pneumatic cylinder, or alternatively an electromagnet.

The present invention relates also to a process for filling containers 2 with powder material, such as can be implemented with the filler head 1 described above.

First, at least one container 2 is positioned on the platform 7 of the support 5. In particular, the container 2 is placed on the top surface 7a of the platform 7 with the mouth 2a facing the duct 4 of the dispensing element 3.

The next step is to weigh the container 2, for the purpose of establishing the tare value, through the agency of the aforementioned weighing means 6 associated with the support 5 and operating along the weigh axis A.

The support 5 is then isolated from the weighing means 6.

More exactly, the first actuator 18 causes the forcing element 19 to assume the first position in which it engages the second portion 10b of the connecting element 10 (FIG. 2). The support 5 is thus elevated, shifting parallel to the weigh axis A, with the result that the contact surface 12 of the projection 11, which engages the active portion 16 of the dynamometer 15 during the weighing step, is made to separate from the selfsame active portion 16.

Thereafter, the container 2 is filled at least in part with a predetermined quantity of powder material, for example measured volumetrically at the dispensing element 3. This bulk-filling step consists in releasing the powder material from the dispensing element 3 and directing it into the container 2 through the relative mouth 2a.

At the same time as the bulk fill is in progress, the support 5 is made to oscillate in the shaking direction B, describing either a reciprocating or a vibratory movement.

In particular, the movable portion 23 of the second actuator 21 is activated and caused to reciprocate within the relative fixed portion 22, agitating the support 5 and the relative container 2 in the shaking direction B. This has the effect of compacting, settling and levelling the powder material inside the container 2.

During this first step of the fill, accordingly, the process succeeds in preventing the formation of a cone of powder material that could heap to a level above the mouth 2a of the container 2.

To reiterate, the shaking direction B can be either transverse or parallel to the weigh axis A, depending on how the movable portion 23 of the actuator 21 is positioned relative to the latter axis A.

After the oscillating step, the forcing element 19 returns to the second position in which it is distanced from the second portion 10b of the connecting element 10, and the support 5 consequently engages the weighing means 6 as before. In other words, the contact surface 12 re-engages the active portion 16 of the dynamometer 15.

There now follows a second filling step in which the container 2 is topped up with the power material to a predetermined weight value corresponding to the final weight of the full container.

Once the quantity of material in the container has registered at the predetermined value, the dispensing element 3 cuts off the flow of powder material automatically.

It has been observed that the shaking action applied to the container 2 becomes more effective when the shaking direction B is parallel to the weigh axis A. This is due to the fact that the forces of inertia which accompany the shaking action are combined with the gravitational force acting on the material. The resultant forces are therefore much stronger and better able to eliminate the cone effect.

Moreover, with the facility of isolating the support 5 from the weighing means 6, especially during the final step of the fill, it becomes possible to achieve a high level of accuracy in dispensing the powder material, without the shaking movement of the support 5 affecting the weighing operation.

The invention claimed is:

1. A head for filling containers with powder material, the head being mounted on a base plate of a carousel having a horizontal disc rotatable about a vertical axis, the head comprising at least one support on which to stand at least one corresponding container, at least one dispensing element positioned in alignment with the support and serving to direct the powder material into the container, also means by which to weigh the container, associated with the support and operating along a substantially vertical weigh axis, wherein it comprises means by which to separate the support from the weighing means.

2. A head as in claim 1, comprising shaking means connected to the support in such a way as to set the selfsame support in motion along a shaking direction.

3. A head as in claim 2, wherein the weigh axis is substantially vertical and the shaking direction is substantially parallel to the weigh axis.

4. A head as in claim 2, wherein the weigh axis is substantially vertical and the shaking direction is substantially transverse to the weigh axis.

5. A head as in claim 1, wherein the weighing means comprise a dynamometer presenting an active portion, and the support presents a contact surface positioned to engage the active portion of the dynamometer.

6. A head as in claim 5, wherein weighing means further comprise a frame substantially of box construction affording a cavity designed to house a dynamometer of which a first end is anchored to the frame and a second end remote from the first end coincides with the active portion; and the support comprises a platform, also a connecting element presenting at least a first portion connected to the platform and at least a second portion occupying the cavity of the weighing means and affording the contact surface.

7. A head as in claim 5, wherein means by which to separate the support from the weighing means comprise a first actuator actively engaging the support in such a way that the selfsame support can be moved between a first operating condition in which the contact surface and the active portion of the dynamometer are isolated one from another, and a second condition in which the contact surface engages the active portion.

8. A head as in claim 7, wherein the first actuator comprises a forcing element capable of movement between a first position of engagement with the second portion of the connecting element in which the support is made to assume the operating condition of the separating means, and a second position distanced from the second portion of the connecting element.

9. A head as in claim 3, wherein the shaking means comprise a second actuator by which the support is engaged and invested with reciprocating movement.

10. A head as in claim 9, wherein the second actuator comprises a fixed portion anchored to the frame and a movable portion associated with the support and inserted into the fixed portion.

11. A process for filling containers with powder material, including the steps of rotating a carousel in such a way to advance at least one head mounted on the same carousel along a circular filling path extending between an infeed station and an outfeed station, placing a container on a support of said head, filling the container with the powder material at least in part, and weighing the quantity of powder material introduced into the container through the agency of weighing means associated with the support and operating along a substantially vertical weigh axis, wherein it comprises the step of separating the support from the weighing means.

12. A process as in claim 11, comprising the further step of causing the support to oscillate along a shaking direction substantially parallel to the weigh axis.

13. A process as in claim 11, comprising the further step of causing the support to oscillate along a shaking direction substantially transverse to the weigh axis.

14. A process as in claim 12, wherein the step of causing the support to oscillate is effected following the step of separating the support from the weighing means.

15. A process as in claim 12, wherein the step of filling the container at least in part with the powder material is effected simultaneously with the step of causing the support to oscillate.

16. A process as in claim 15, comprising the step of filling the container with the powder material to a predetermined weight value sensed by the weighing means, effected following the step of causing the support to oscillate.

17. A head as in claim 4, wherein the shaking means comprise a second actuator by which the support is engaged and invested with reciprocating movement.

18. A process as in claim 13, wherein the step of causing the support to oscillate is effected following the step of separating the support from the weighing means.

19. A process as in claim 13, wherein the step of filling the container at least in part with the powder material is effected simultaneously with the step of causing the support to oscillate.

20. A process as in claim 19, comprising the step of filling the container with the powder material to a predetermined weight value sensed by the weighing means, effected following the step of causing the support to oscillate.

21. A head for filling containers with powder material, the head being mounted on a base plate of a carousel having a horizontal disc rotatable about a vertical axis, the head comprising at least one support on which to stand at least one corresponding container, at least one dispensing element positioned in alignment with the support and serving to direct the powder material into the container, also means by which to weigh the container, associated with the support and operating along a substantially vertical weigh axis, wherein the weighing means comprise a dynamometer presenting an active portion, and the support presents a contact surface positioned to engage the active portion of the dynamometer; wherein a first end of the dynamometer is anchored to the frame and a second end remote from the first end coincides with the active portion; wherein it comprises means by which to separate the support from the weighing means comprising a first actuator actively engaging the support in such a way that the selfsame support can be moved between a first operating condition in which the contact surface and the active portion of the dynamometer are isolated one from another, and a second condition in which the contact surface engages the active portion.

* * * * *